United States Patent [19]

Snyder et al.

[11] 4,456,275
[45] Jun. 26, 1984

[54] RUNNING BOARD CONSTRUCTION

[75] Inventors: Steven A. Snyder, Constantine, Mich.; Gary L. Reeve, LaGrange, Ind.

[73] Assignee: Coachmen Industries, Inc., Middlebury, Ind.

[21] Appl. No.: 348,507

[22] Filed: Feb. 12, 1982

[51] Int. Cl.$^3$ ............................................... B60R 3/00
[52] U.S. Cl. ..................................... 280/163; 52/188; 182/92; 362/81
[58] Field of Search ............... 280/163, 164 R, 164 A, 280/169; 182/90, 92; 52/182, 191, 188, 729, 291, 222, 223; 362/81

[56] References Cited

U.S. PATENT DOCUMENTS

| | | | |
|---|---|---|---|
| 2,077,822 | 4/1937 | Baker | 250/33 |
| 2,630,605 | 3/1953 | Hobson et al. | 52/291 |
| 2,833,608 | 5/1958 | Tobias | 311/17 |
| 3,774,952 | 11/1973 | Zorn | 52/188 X |
| 4,203,611 | 5/1980 | Makela | 280/163 |
| 4,257,620 | 3/1981 | Okland | 280/153 R |
| 4,311,320 | 1/1982 | Waters, Jr. | 280/169 X |

OTHER PUBLICATIONS

*SX-11 Super Stepguard Running Boards,* Kenco Engineering.

*Primary Examiner*—Joseph F. Peters, Jr.
*Assistant Examiner*—Michael Mar
*Attorney, Agent, or Firm*—Lockwood, Dewey, Alex & Cummings

[57] ABSTRACT

A running board construction for mounting to a vehicle includes an elongate deck and at least one bracket extending beneath and transverse to the deck, the bracket being attachable to the frame of the vehicle for mounting the running board to the vehicle. A single channel is formed integrally with the underside of the deck in substantially the center of the deck and a pair of flanges are also formed integrally with the deck and spaced to both sides of the channel. The channel slidingly receives a bolt for fastening the bracket to the underside of the deck and the flanges extend to a lower elevation than the channel, such that when the bolt is tightened, the bracket is bowed beneath the deck.

18 Claims, 5 Drawing Figures

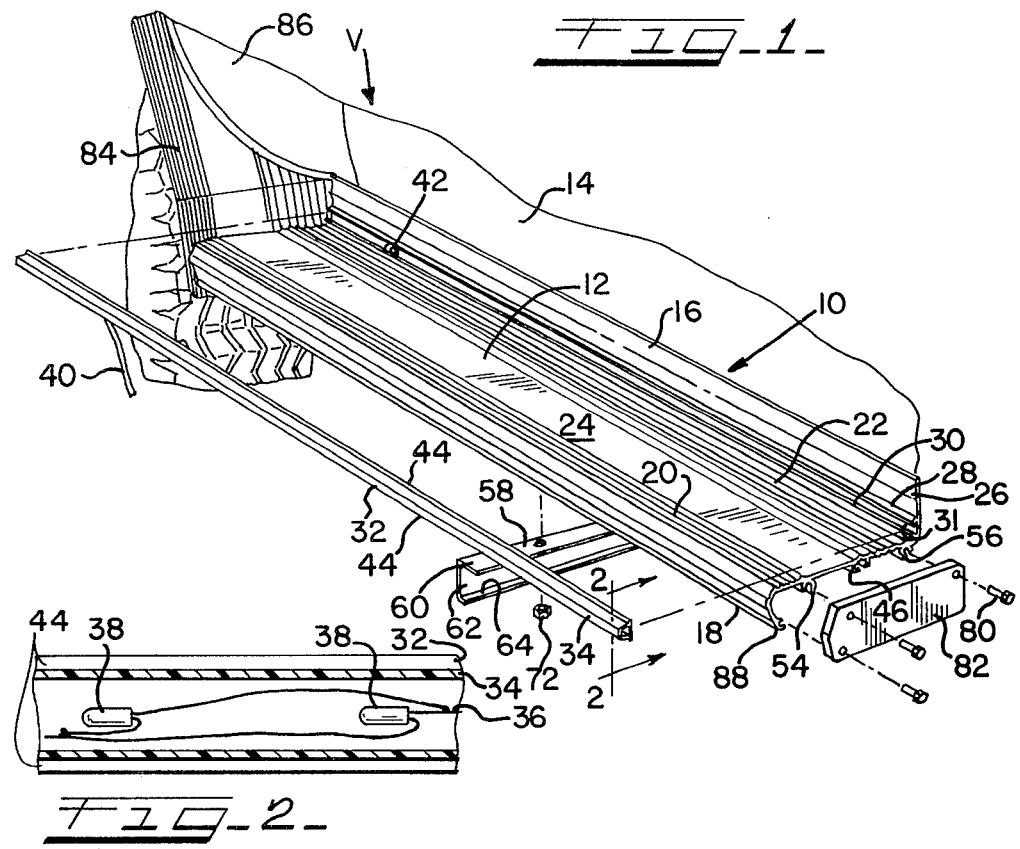
Fig-1
Fig-2
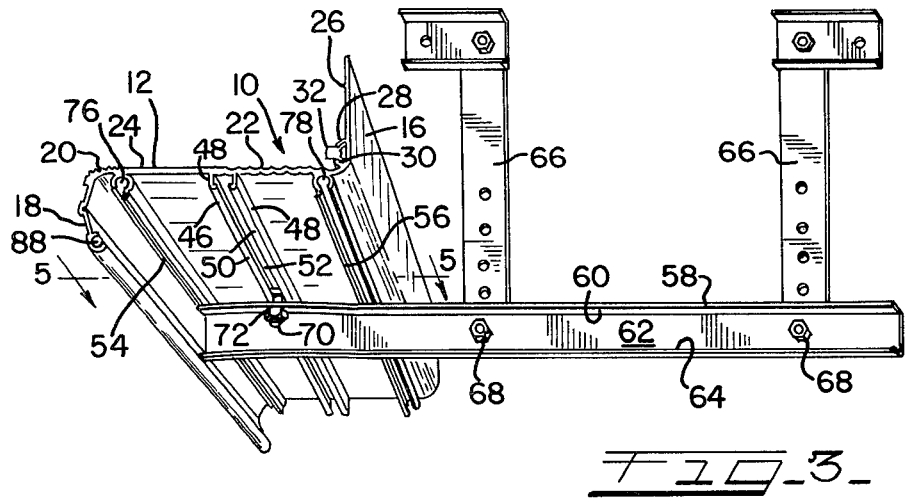
Fig-3

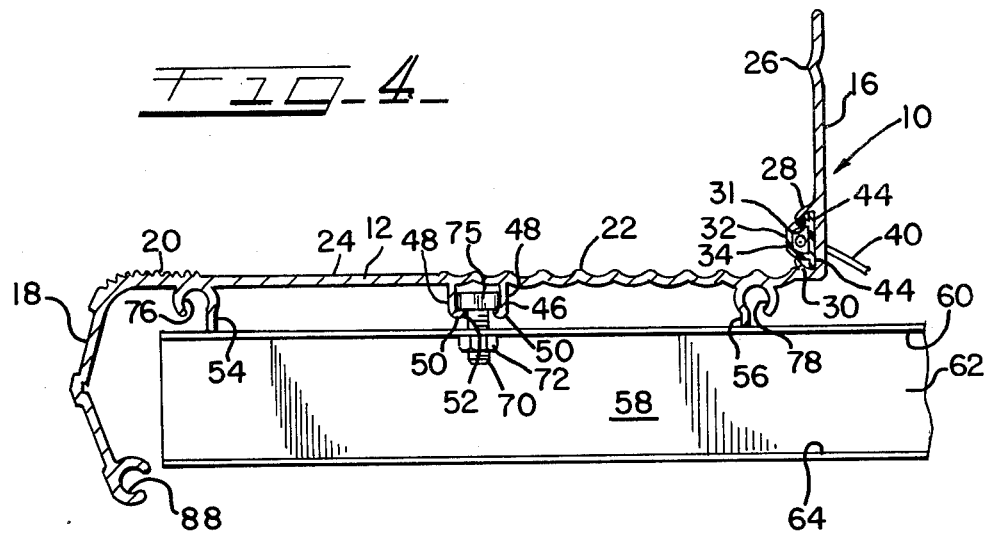
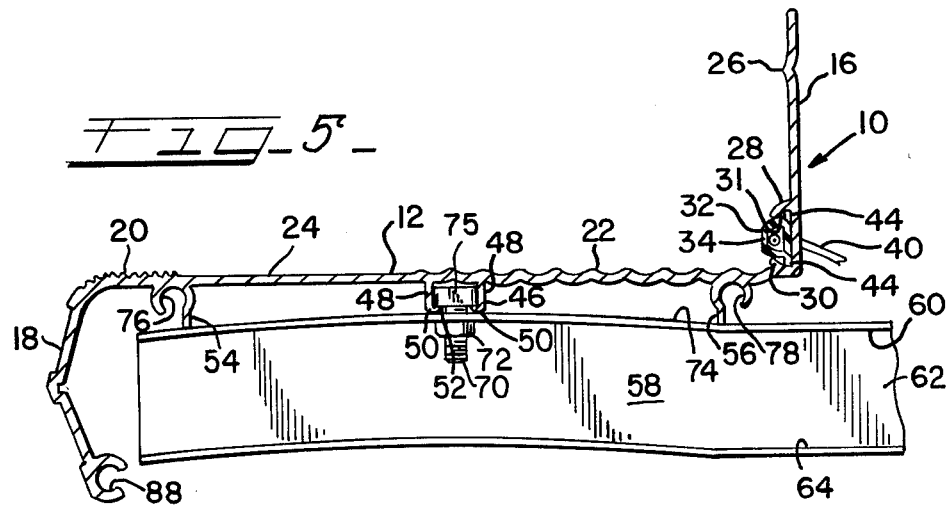

RUNNING BOARD CONSTRUCTION

BACKGROUND AND SUMMARY OF THE INVENTION

The present invention relates to a running board construction for mounting to a vehicle and, more particularly, to an improved fastening construction for mounting the running board.

Running boards have been widely used over a number of years for attaching to the cab of a vehicle to facilitate ingress and egress from the cab by the driver and passengers. Likewise, a wide variety of mounting assemblies and fastening means have been employed for the mounting of these running boards. One such fastening assembly has included a pair of elongate channels which were formed integrally with the underside of the deck of the running board and into which were inserted fastening bolts which could be slidably adjusted along the length of each of the channels to align with one or more frame mounting brackets to attach the brackets to the running board deck. In turn, the brackets were attached to the frame of the vehicle such that the running board was firmly mounted to the vehicle frame.

Although such prior constructions, including the aforementioned double channel construction, were generally satisfactory, they did suffer several disadvantages. One disadvantage was that the presence of the plural channels increased the weight of the running board construction and required the use of additional material resulting in an increase in the cost of the running board, particularly where the running board is formed of relatively expensive materials, such as aluminum. The plural channels also necessitated the use of multiple fasteners which required additional parts and assembly steps. Moreover, the spacing of the channels was such that the center of the running board deck which usually experiences most of the traffic was not directly supported.

The running board construction of the present invention solves these aforementioned disadvantages and also enjoys several additional advantages not previously realized by the prior art constructions. In the first instance, a running board construction incorporating the principles of the present invention utilizes only a single fastener channel on the underside of the running board deck. Thus, the weight of the deck is reduced, less material is needed, and fewer fastener bolts are required reducing the number of parts and steps needed to mount the running board construction to the vehicle. In a running board construction incorporating the principles of the present invention, support and strengthening of the running board deck is substantially improved over the prior constructions, and a bowed, springing effect of the mounting bracket is realized which also substantially improves the rigidity and strength of the mounting of the running board. Another advantage of a running board construction incorporating the principles of the present invention is that a portion of the structure for fastening the bracket to the running board may also serve the dual function of facilitating fastening of the ends of the running board deck to covering elements.

In one principal aspect of the present invention, a running board for mounting on a vehicle comprises an elongate deck and mounting means for substantially horizontally mounting the deck to the vehicle. The mounting means includes at least one elongate bracket means for extending beneath and substantially transverse to the deck and the bracket means is also attachable to the frame of the vehicle. Fastener means fastens the elongate bracket means to the underside of the deck such that when the fastener means is fastened to the deck, the elongate bracket means is bowed by the fastener means over at least a portion of its length beneath the deck.

In another principal aspect of the present invention, the aforementioned fastener means includes a channel formed integrally with the underside of the deck and extending longitudinally of the deck. The channel has inwardly turned lips extending towards each other and bolt means, which are non-rotatable but are freely slidable in the channel, overlie the bracket means and are operable, when tightened, to attach the bracket means to the channel. A pair of flanges are spaced to either side of the channel and also extend longitudinally of the deck. The flanges extend to an elevation lower than the channel and into contact with the bracket means such that when the bolt means is tightened, a portion of the bracket means is bowed against the flanges and the channel.

These and other objects, features and advantages of the present invention will be clearly understood through a consideration of the following detailed description.

BRIEF DESCRIPTION OF THE DRAWINGS

In the course of this description, reference will frequently be made to the attached drawings in which:

FIG. 1 is an overall perspective view showing a preferred embodiment of running board construction in accordance with the principles of the present invention and in which parts have been exploded for a clearer understanding of the running board construction;

FIG. 2 is an enlarged, partially broken, cross-sectioned, side elevational view of a preferred embodiment of a light strip for use with the running board construction of the present invention and as viewed substantially along line 2—2 of FIG. 1;

FIG. 3 is a partially broken perspective view of the running board construction shown in FIG. 1, but as viewed from beneath and showing the bracket for attachment of the running board construction to the frame of the vehicle.

FIG. 4 is an enlarged, cross-sectioned, end elevational view of the running board construction shown in FIG. 3, but prior to tightening of the running board deck to the bracket; and FIG. 5 is an enlarged cross-sectioned end elevational view after tightening of the running board deck to the bracket as viewed substantially along line 5—5 of FIG. 3.

DESCRIPTION OF THE PREFERRED EMBODIMENT

An overall view in perspective of a preferred embodiment of running board construction 10 is shown in FIGS. 1 and 3. The construction generally comprises an elongate running board deck 12 which preferably extends over substantially the length of the cab door 14 of the vehicle V to which the running board is to be mounted. A kickplate 16 extends vertically from the inner vehicle side of the deck 12 and covers any gap which may exist between the deck and the vehicle body. The kickplate 16 is preferably formed integrally with the deck 12, such as by extruding the plate with the deck. To complete the general construction of the running board, a downturned outer flange 18 extends along the length of the deck. The outer flange 18 is also preferably formed integrally with the deck 12, such as by extrusion with the deck, and has both a decorative as well as strengthening function for the deck 12. The deck 12, kickplate 16 and outer flange 18 may be formed of any suitable material, such as aluminum.

The topside of the deck 12 preferably includes a plurality of longitudinally extending ridges 20 extending along its front edge. The ridges 20 are not only decorative, but also function to define a non-skid surface and act as squeegees to remove moisture and foreign matter from the shoes of the vehicle passengers. A plurality of additional ridges 22 are also preferably formed along the inner or vehicle side of the deck which also define decorative and non-skid surfaces. A flat portion 24 preferably extends longitudinally of the deck between the ridges 20 and 22 for receiving an abrasive, non-skid tape (not shown).

As previously mentioned, the kickplate 16 is preferably formed integrally with the deck 12, for example by extrusion with the deck. Such integral attachment of the kickplate 16 to the deck 12 not only improves the strength of the deck, but also eliminates the need to mount the kickplate to the deck during assembly. The kickplate 16 may include one or more ridges 26 extending longitudinally of the kickplate which not only have a decorative function, but also improve the strength and rigidity of the kickplate.

A pair of longitudinally extending flanges 28 and 30 also preferably extend longitudinally over the length of the kickplate 16 and are formed integrally with the kickplate, also for example by extrusion. These flanges 28 and 30 are turned inwardly toward each other so as to define a channel 31 into which a light strip 32 may be slidably inserted from the end of the channel. The light strip 32 may be formed of an elongate flexible polymeric tube 34 into which electrically conductive wires 36 and small incandescent bulbs 38, as shown in FIG. 2, are strung in parallel. A lead 40, as shown in FIGS. 1, 4 and 5, extends from the tube wall 34 and through a single drilled hole 42 in the kickplate 16 between the flanges 28 and 30. The lead 40 may be wired to either the headlight circuitry of the vehicle for operation when the headlights are on, or to the vehicle cab dome light circuitry for operation of the light strip when the cab door 14 is opened. The tube 34 has a pair of outwardly extending flanges 44 so that the light strip 32 will be held in place between the flanges 28 and 30 when it is in the channel 31.

Although a single light strip 32 is shown, it will be understood that more than one light strip may be slidably inserted into the channel 31. For example, one light strip may be wired to the headlight circuitry and have amber bulbs 38 which light whenever the headlights of the vehicle are on, and a second light strip may be wired to the dome light circuitry and have white bulbs 38 which light when the cab door 14 is opened.

Such light strips generally have previously been employed in running board constructions. However, they have been mounted to the kickplate 16 by separate channels which are riveted along their length to the face of the kickplate. Such separate channel construction necessiates additional assembly steps, increases the weight of the running board, reduces the strength of the kickplate due to the need for the several rivet holes to attach the separate channel to the kickplate, and is subject to being kicked loose. It has been discovered that by forming the flanges 38 and 40 integrally with the kickplate 16, materials and assembly time are substantially reduced, damage due to kicking is substantially reduced, and the integrally formed flanges 28 and 30 actually substantially strengthen the kickplate 16, rather than detract from its strength. Even if the light strip is not installed in the channel 31, the flanges 28 and 30 do not detract from the appearance of the assembly and still provide this strengthening function. Moreover, because the light strip receiving assembly is formed integrally with the running board construction, it is always present and available for subsequent installation of the light strip, whereas separate channels frequently become lost after installation of the running board assembly, if the channels are not mounted at the time of mounting of the running board to the vehicle. On the other hand, if the separate channels of the prior art are mounted without the light strip in them, they are unsightly due to the uncovered rivets.

Turning now to the means for mounting the running board construction 10 to the vehicle frame, an elongate channel 46 extends longitudinally over the length of the deck on the underside of the deck 12. The channel 46 comprises a pair of spaced, downwardly extending walls 48 terminating in inwardly turned lips 50 which define an elongate slot 52 over the length of the channel. The channel is preferably positioned substantially central of the width of the deck 12 and is preferably formed integrally with the deck, such as by extrusion. A pair of downwardly extending flanges 54 and 56 also extend longitudinally of the deck in spaced and straddling relationship to the channel 46. The flanges 54 and 56 are somewhat wider in height than the walls 48 of the channel 46 and, thereby, extend lower in elevation than the channel walls for a purpose to be described shortly. By way of example, the flanges 54 and 56 may extend on the order of 0.15 inch beneath the bottom of channel 46. Flanges 54 and 56 are also preferably formed integrally with the deck, such as by extrusion.

An elongate mounting bracket 58 extends transversely of the deck 12 and beneath the deck as shown in FIGS. 3-5. The bracket 58 preferably comprises an angle member having a horizontal flange 60, a vertical web 62, and a short width, horizontal flange 64 along the bottom edge for strengthening of the bracket. The bracket 58 is preferably formed of aluminum, but may be formed of any material which may be selected by one skilled in the art and which is sufficiently strong, but yet is capable of flexing or bowing as will be described to follow. One or more frame mounting arms 66 as shown in FIG. 3 may be adjustably attached as by bolts 68 to the inner vehicle end of the bracket 58 for mounting the bracket to the frame (not shown) of the vehicle V.

A hole (not shown) is drilled through horizontal flange 60 of the bracket 58 near, but spaced from the outer end of the bracket to receive an elongate fastening stud, such as a bolt 70, as shown in FIGS. 3-5, for fastening the bracket 58 to the underside of the deck 12. The bolt hole in flange 60 is spaced from the outer end of the bracket 58 by a sufficient distance such that when the bolt is positioned in channel 46 and through the bracket hole, the outer end of the bracket 58 extends beneath the outer flange 54. When the bracket 58 is so positioned and a nut 72 is threaded on the bolt 70 and tightened, the bracket 58 is drawn upwardly toward the channel 46 as shown in FIG. 5 due to the differing elevation of the channel 46 relative to the flanges 54 and 56. Thus, the portion of the bracket 58 beneath the deck is bowed upwardly toward the underside of the deck by an amount essentially equal to the difference in elevations between the bottom of the channel 46 and the bottoms of the flanges 54 and 56 as shown in FIG. 5 and the flanges 54 and 56 thereby constitute spacer means which effects such bowing. Such bowing compresses the bracket to strengthen and rigidify the fastening of the bracket to the deck. It will be seen that not only does the bowed portion 74 of the bracket 58 beneath the deck create a locking effect on the nut 72, but the deck is actually supported at three points across its width at flanges 54 and 56 and at the channel 46 to further strengthen the deck against the weights which must be supported by the deck during use. Further strengthening is realized due to the presence of the channel 46 itself down the center of the deck and the flanges 54 and 56 along the edges of the deck. Because these elements are formed integrally with the deck and also because of their spacing across the width of the deck they form strengthening ribs which further reinforce the deck. It will also be seen that only a single fastener bolt 70 is necessary, thus reducing the number of parts needed for mounting and the number of mounting steps.

The head 75 of the bolt 70 preferably has flat sides to prevent the bolt from turning when the nut 72 is tightened. However, the bolt is readily slidable along the channel 46 over the length of its slot 52 to allow rapid positioning of the bolt relative to the bracket 58.

Preferably the flanges 54 and 56 define one side of an additional smaller pair of channels 76 and 78 which also extend longitudinally of the underside of the deck 12 and are formed integrally therewith. These additional channels 76 and 78 act to further reinforce the deck and also provide sites at their ends for receiving self-tapping screws 80 which may be threaded into the ends of channels 76 and 78 for attachment either of an end cap plate 82 or of a stone guard plate 84 which is attached to the fender 86 of the vehicle V, both as shown in FIG. 1. An additional channel 88 may also be provided for these purposes. Channel 88 extends longitudinally along the lower edge of the outer flange 18.

From the foregoing, it will be seen that the running board construction of the present invention realizes a reduction in the number of fasteners and the attendant mounting steps necessary to fasten the running board to the frame mounting bracket 58. Moreover, not only is the support of the running board deck 12 by the bracket 58 substantially improved and spread over the width of the running board and the running board deck 12 strengthened by the centrally extending channel 46 and spaced flanges 54 and 56, but also a bowing action is realized when these elements are fastened together to substantially improve the rigidity and strength of the assembly. The aforementioned preferred embodiment of running board construction realizes these advantages and yet also realizes a reduction in weight and in materials. It has been found, for example, that provision of the single channel construction 46 instead of the dual channel constructions of the prior art realizes a weight reduction of approximately 0.2 pounds per foot of running board length where the running board is formed of aluminum.

It will be understood that the preferred embodiment of running board construction which has been described may be varied by those skilled in the art without departing from the principles of the present invention. For example, a channel, such as channel 31 on the kickplate 16, may be integrally formed on the front downwardly extending flange 18, either in addition to or in lieu of the upwardly extending kickplate 16. In this event, the channel would also strengthen the flange 18 as previously described. Also, slidable elements other than or in addition to the light strip 32 may be inserted in the channel 31, such as a reflective strip or color coordinating strip.

It will also be understood that the embodiment of the present invention which has been described is merely illustrative of a few of the applications of the principles of the present invention. Numerous modifications may be made by those skilled in the art without departing from the true spirit and scope of the invention.

What is claimed is:

1. A running board for mounting on a vehicle comprising:
    an elongate deck;
    mounting means for substantially horizontally mounting said deck to the vehicle, said mounting means including at least one elongate bracket means for extending beneath and substantially transverse to the deck, said bracket means also being attachable to the frame of the vehicle; and
    fastener means for fastening said elongate bracket means to the underside of said deck such that when said fastener means is fastened to the deck said elongate bracket means is bowed upwardly toward the underside of said deck by said fastener means over at least a portion of its length beneath the deck, said fastener means including spacer means in contact with said bracket means for spacing at least a part of said bracket means from the underside of said deck, and means spaced from said spacer means for drawing said bracket means upwardly to effect bowing of said bracket means.

2. The running board of claim 1 wherein said bowed portion of said bracket means supports the underside of the deck at at least two locations spaced along the length of said portion.

3. The running board of claim 2 wherein said bowed portion of said bracket means supports the underside of the deck at at least three locations spaced along the length of said portion.

4. The running board of claim 1 wherein said fastener means includes a channel fixed to the underside of said deck and extending longitudinally of said deck, said channel having inwardly turned lips extending toward each other, and stud means being non-rotatable, but freely slideable in said channel to overlie said bracket means and being operable when tightened to fasten said bracket means to said channel.

5. The running board of claim 4, wherein said stud means comprises a bolt.

6. The running board of claim 4 wherein said channel extends substantially continuously over the length of the deck.

7. The running board of claim 4 wherein said channel is a single channel only which is located adjacent the center of the deck relative to the width of the deck.

8. The running board of claim 4 wherein said channel is formed integrally with said deck.

9. The running board of claim 4 wherein said spacer means includes at least one flange fixed to the underside of said deck and which extends longitudinally of said deck in spaced relationship to said channel, said flange extending to an elevation lower than said channel and into contact with said bracket means such that when said stud means is tightened said portion of said bracket means is bowed against said flange and channel.

10. The running board of claim 9 including a pair of said flanges, said channel being positioned between said pair of flanges.

11. The running board of claim 9 including a second channel, said second channel being defined at least in part by said flange, said second channel receiving second fastener means for fastening cover means to the end of said deck.

12. The running board of claim 1 wherein said fastener means includes a single channel formed integrally with the underside of said deck adjacent substantially the center thereof and extending longitudinally of said deck, said channel having inwardly turned lips extending toward each other, bolt means being non-rotatable, but freely slideable in said channel to overlie said bracket means and being operable when tightened to attach said bracket means to said channel, and said spacer means includes at least one flange formed integrally with the underside of said deck and which extends longitudinally of said deck in spaced relationship to said channel, said flange extending to an elevation lower than said channel and into contact with said bracket means such that when said bolt means is tightened said portion of said bracket means is bowed against said flange and channel.

13. The running board of claim 12 including a pair of said flanges, said channel being positioned between said pair of flanges.

14. The running board of claim 13 wherein said channel extends substantially continuously over the length of the deck.

15. A running board for mounting on a vehicle comprising:

an elongate deck having elongate longitudinal edges spaced from each other across the width of the deck;

mounting means for substantially horizontally mounting said deck to the vehicle, said mounting means including at least one elongate bracket means extending beneath and substantially transverse to the width of the deck and supporting said deck at transversely and substantially spaced points along said bracket means, said bracket means also being attachable to the frame of the vehicle;

fastener means for fastening said elongate bracket means to the underside of said deck, said fastener means including:

a single channel extending longitudinally of said deck and fixed to the underside thereof, said single channel having a portion thereof adjacent the center of the deck relative to its width, stud means; and means for supporting said stud means solely in said single channel and such that said stud means extends downwardly from said single channel and is slidably movable in said single channel to overlie said bracket means, said means for supporting said stud means also having a portion thereof adjacent the center of the deck relative to its width, said stud means being operable when tightened to fasten said means for supporting said stud means and said bracket means to said single channel.

16. The running board of claim 15, wherein said stud means comprise at least one bolt, the head of said bolt having at least one flat side thereon, said flat side engaging said fastener means to prevent turning of said bolt as said bolt is tightened.

17. The running board of claim 16, wherein said flat side of said head engages said stud supporting means.

18. The running board of claim 15, including a pair of additional channels defined at least in part by said fastener means, said pair of channels receiving second fastener means for fastening cover means to the end of said deck.

* * * * *